United States Patent [19]

Behn et al.

[11] 4,267,059

[45] May 12, 1981

[54] AUXILIARY FOR IMPROVING RETENTION, DEWATERING AND WORKING UP, PARTICULARLY IN THE MANUFACTURE OF PAPER

[75] Inventors: Rudolf Behn; Lutz Hoppe; Branislav Böhmer, all of Walsrode, Fed. Rep. of Germany

[73] Assignee: Wolff Walsrode Aktiengesellschaft, Leverkusen, Fed. Rep. of Germany

[21] Appl. No.: 84,647

[22] Filed: Oct. 15, 1979

Related U.S. Application Data

[63] Continuation of Ser. No. 930,188, Aug. 2, 1978, abandoned.

[30] Foreign Application Priority Data

Aug. 13, 1977 [DE] Fed. Rep. of Germany ....... 2736651

[51] Int. Cl.$^3$ .............................................. D21H 3/52
[52] U.S. Cl. .............................. 210/736; 162/164 EP; 210/705; 210/928; 525/430
[58] Field of Search ..................... 162/164 R, 164 EP; 210/54, 736, 705, 928; 525/430

[56] References Cited

U.S. PATENT DOCUMENTS

| | | | |
|---|---|---|---|
| 3,753,931 | 8/1973 | Ruspanti | 162/164 EP |
| 4,036,821 | 7/1977 | Hoppe et al. | 162/164 R |

*Primary Examiner*—William F. Smith
*Attorney, Agent, or Firm*—Connolly and Hutz

[57] ABSTRACT

An auxiliary for improving the retention of flushable solids, for accelerating the dewatering of suspensions and for more rapidly working up industrial waters, effluents and sludges by the addition of a basic water-soluble polymer being produced by reacting (a) an aliphatic polyethylene glycol ether amine and (b) a basic polyamino amide to form an intermediate product and (c) reacting said intermediate with an epihalohydrin, dihaloalkane, glyoxal-bis-acrylamide, bis-acrylamidoacetic acid, acrylamidoglycolic acid or tetraalkyloxyethane.

5 Claims, No Drawings

AUXILIARY FOR IMPROVING RETENTION, DEWATERING AND WORKING UP, PARTICULARLY IN THE MANUFACTURE OF PAPER

This application is a continuation of application Ser. No. 930,188 filed Aug. 2, 1978, abandoned.

This invention relates to an auxiliary for improving the retention of flushable solids, for accelerating the dewatering of suspensions and for more rapidly working up industrial waters, effluents and sludges by the addition of basic water-soluble polymers in the form of an aqueous polymer solution, particularly in the paper industry.

Polymers of the type in question and their use for the above-mentioned purpose in the manufacture of paper are already known from numerous publications. Thus, DT-AS No. 1,546,290 describes reaction products of polyalkylene polyamines and bifunctional polyalkylene oxide derivatives which, although suitable for the flotation of fibres and fillers from paper machine effluents, are not as suitable, as would basically be desirable, for use as retention and dewatering auxiliaries in the paper making industry. U.S. Pat. No. 3,575,797 also describes viscous flotation agents for paper machine effluents. These flotation agents are reaction products of polyalkylene polyamines with polyethylene glycol derivatives which contain at least 2 chloroformic acid ester groups. Unfortunately, these products can only be produced in the form of a 10% solution and, in addition, show only relatively poor retention and dewatering properties.

Other auxiliaries recommended for the above mentioned purpose are described in DT-OS No. 2,162,567. In this case, a polyaminoamide (produced for example by condensing adipic acid and diethylene triamine) is added to a polyether having a filament-like molecular structure and containing terminal tertiary amino groups (produced for example from glycol, epichlorhydrin and dimethylamine) through the $CH_2$-Cl-groups and the addition product thus obtained is subsequently reacted with epichlorhydrin. The above mentioned addition product itself is highly branched so that its subsequent cross-linking with epichlorhydrin results in a highly tangled molecular structure which is a disadvantage where this auxiliary is used as a retention and dewatering agent because, on account of this tangled molecular structure, only a fraction of the molecule of the auxiliary can become fully effective in the above mentioned sense.

DT-AS No. 2,127,082, another publication to be mentioned in the present context, describes a complicated process for the production of dewatering and retention aids in which cross-linking of the reaction products of polyepichlorhydrin and polyamides with bis-chlorhydrin gives relatively unfavourable molecular structures which prevent the high cationic charge basically present in the molecule from developing its full effect in an application of the type mentioned above and, hence, are not optimally active in the manufacture of paper.

The same applies to the product described in DT-OS No. 2,255,586 which merely contains polyethylene glycol as an additional unit for otherwise basically the same structure.

DT-OS No. 2,244,513, another publication on the subject in question, describes similar products which are obtained from polyepichlorhydrin, diamine and polyalkylene polyamines, followed by crosslinking, for example with epichlorhydrin. On account of their structure, however, these products are also unsuitable for effective use as flocculation, retention and, at the same time, dewatering aids in the manufacture of paper.

Other similar products are known from DT-OS No. 2,434,816 and the associated Addition, DT-OS No. 2,515,760. In this case, polyaminoamides produced from polyglycol ethers and epichlorhydrin are reacted with crosslinking agents until a required viscosity is obtained. However, molecular structures ill-suited to the above mentioned application in the paper industry are formed in this case, too, the absence of amino groups in the large ethylene oxide molecules resulting in a stronger dependence on pH and hence in limited effectiveness.

In DT-OS No. 2,436,386, the final publication to be mentioned in the present context, polyethylene polyamines containing from 15 to 500 alkylene imine units are reacted and hence crosslinked with a crosslinking agent obtained by reacting polyalkylene glycol ether with epichlorhydrin in quantities of from 0.08 to 0.001 mole of crosslinking agent per equivalent of nitrogen in the polyalkylene polyamine. Apart from objections to the use of alkylene imines as sole starting materials on account of their carcinogenic properties, considerable technical outlay is involved in safely carrying out the above mentioned reaction. This adversely affects production costs. In addition, the polyalkylene glycols mentioned in DT-OS No. 2,436,386 are incapable of developing any particularly favourable retention and dewatering effect on account of their linkage with the certain type of other units of the macromolecule caused by the above mentioned structure.

The prior art acknowledge in the foregoing describes products which contain polyalkylene glycol compounds as a constituent. In cases where these products are used as retention aids, it has to be remembered that polyalkylene glycols do not carry the cationic charges recognised among experts as necessary for obtaining a favourable retention effect.

Accordingly, the outcome of long-standing efforts to solve the continuing problem of improving the retention effect of products of the type in question was to dispense with this incorporation of a polyalkylene glycol unit hitherto considered necessary for other reasons. The retention agents free from polyalkylene glycol units which have hitherto been described in this connection are discussed in the following acknowledgement of the relevant prior art. First of all, reference is made to German Pat. No. 1,771,814 which describes the use of basic polyamino amides for increasing the retention of fillers and pigments in the manufacture of paper, for accelerating the dewatering of pulp suspensions and for working up paper machine effluents by filtration, sedimentation and flotation by the addition of basic polyamides to the pulp suspensions and/or paper machine effluents. In this case, the basic polyamides used are high molecular weight water-soluble products which are obtained by the action of compounds polyfunctional with respect to amino groups on solutions or dispersions in water of basic polyamides of polyfunctional amines, dicarboxylic acids and aminocarboxylic acids containing at least 3 carbon atoms or their lactams and for whose production from 1 val of the basic amino groups present in the basic polyamides less than 1 val of reactive groups was used in the polyfunctional compounds. In this case, therefore, the polyalkylene polyamines are crosslinked with epichlorhydrin for example. On account of the starting units which are attached to one another in the process, the product formed and subsequently acidified has a structure in which for example there are no cationic side chains, so that there is still no question of an optimum reaction and dewatering effect.

Applicant's earlier proposal in the form of DT-OS No. 2,353,430, which is based on French Pat. No. 2,094,645, may be regarded as a further development in this direction. This proposal is directed to the production and use of water-soluble paper making aids based on polyamino amides, the dimeric fatty acids described in the above-mentioned French Patent Specification as earlier prior art as forming part of the mixture of starting monomers for the production of a retention-active macromolecule in the manufacture of paper being replaced in the above mentioned DT-OS No. 2,353,430 by short, but more cation-active and hence more retention-active side chains. In this DT-OS, basic polyamino amides are in principle reacted with ammonium compounds, obtained by the action of a polyfunctional compound on a tertiary amine, before being crosslinked with polyfunctional cross-linking agents, such as epichlorhydrin for example. Although this known macromolecular compound has a considerably better retention effect than virtually all the products known from the previously acknowledged prior art, the retention, dewatering and working-up effects obtainable with it are still not entirely satisfactory so far as the manufacture of paper is concerned.

Accordingly, continuing efforts to solve the problem of providing suitable auxiliaries with a further increased retention effect resulted in the development of a macromolecule different from that described in the above mentioned DT-OS No. 2,353,430, namely the macromolecule described in German Pat. Nos. 2,502,874 and 2,538,745 (Addition to German Pat. No. 2,502,874). The products in question have a particular sedimentation effect, being obtained by crosslinking with epichlorhydrin polyamino amides and polyamines obtained by the action of monofunctional or polyfunctional amines on the reaction product of dimethylamines and epichlorhydrin. Three-dimensional molecular structures are formed in this way and have an extremely good effect in the manufacture of paper in the acid and neutral pH range, although they fail to reach the optimum activity levels still required by experts.

In conclusion, it may be said of the prior art discussed in the foregoing that neither the products described there which contain polyethylene glycols as a constituent, nor the products which contain polyamino amides as a constituent nor even the products according to German Offenlegungsschrifts Nos. 2,434,816 and 2,515,760 which contain both polyalkylene glycols and also polyamino amides as constituents, develop an optimum retention effect.

Since the unsatisfactory use of these products would appear to be attributable to "unit-location-dependent" factors relating to the macromolecule, although this is by no means certain, it might have been expected that experts would look for ways other than those mentioned above. In this connection, it would have been obvious to ignore macromolecular compounds containing polyethylene glycol as a constituent unit because polyalkylene glycols are known to lack positive or negative charges which are of course an essential requirement for a good retention effect. Accordingly, the most recently known products with, comparatively speaking, the best retention effects, as described in particular in German Pat. Nos. 2,502,874 and 2,538,745, no longer contain any constituent units in the form of polyalkylene glycol compounds or their derivatives. Accordingly, in the context of the continuing problem of providing even better retention agents, the solution to this problem as provided by the present invention and as discussed in the following is completely unexpected and surprising insofar as, in spite of the above-described unfavourable properties of polyalkylene glycol units hitherto known to the expert, an even more effective auxiliary has now been found of which the composition according to the invention again includes polyalkylene glycol compounds as a constituent unit and which is characterised in that it consists of a reaction product C which is obtained from the reaction of an aliphatic polyethylene glycol ether amine as a first component product A, formed by the action of polyfunctional aliphatic amines on the reaction product of a polyethylene glycol (as polydiol unit) which epichlorhydrin, with basic polyamino amides as a second component product B known per se from the above mentioned German Pat. No. 2,502,874 and formed from at least one polyalkylene polyamine and/or at least one aminocarboxylic acid or its lactam and/or hexamethylene diammonium adipate, the halogen groups of component product A reacting with the —NH— groups of component product B with elimination of hydrohalic acids and simultaneous formation of the intermediate product AB, by reacting the intermediate product AB thus obtained with polyfunctional compounds.

Although the polyfunctional compounds used may be any products selected for example from a group comprising inter alia epibromhydrin, epifluorhydrin, dihalogen alkanes, glyoxal-bis-acrylamide, bis-acrylamidoacetic acid, acrylamidoglycolic acid, tetraallyloxyethane and other compounds, it is preferred to use epichlorhydrin.

The other units of the auxiliary according to the invention may also be qualitatively and quantitatively varied accordingly without departing from the scope of the invention. Thus, the reaction product C according to the invention may be formed from the reaction of 1 mole, based on polyethylene glycol, of the polyethylene glycol ether amine as the first component product A which is formed by the action of 0.25 to 1 mole of a polyalkylene polyamine corresponding to the general formula

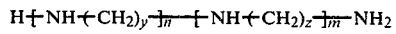

in which y and z are integers from 2 to 4, n is an integer from 2 to 5 and m is an integer from 0 to 5, and/or 0.25 to 2 moles of an amine corresponding to the general formula

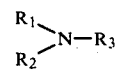

in which $R_1$ and $R_2$ are the same or different and represent alkyl radicals of the general formula $C_xH_{2+1}$ or $C_xH_{2x}$—OH, where x is an integer from 1 to 4, and in which $R_3$ is hydrogen or an alkyl radical of the general formula $C_xH_{2x+1}$ where x is an integer from 1 to 4, on the reaction product of 1 mole of a polyethylene glycol corresponding to the general formula

in which x is an integer from 1 to 27, with 2 moles of epichlorhydrin, with from 0.5 to 7 moles, based on the polyalkylene polyamine, of the basic polyamino amide as the second component product B known per se, followed by reaction of the intermediate product AB thus formed with the polyfunctional compound.

Particularly good results are obtained with an auxiliary according to the invention in which the reaction product C is formed from the reaction of 1 mole, based on polyethylene glycol, of the polyethylene glycol ether amine as the first component product A formed by the action of 0.7 to 1 mole of a polyalkylene polyamine corresponding to the general formula

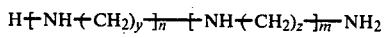

in which y and z are integers from 2 to 3, n is an integer from 2 to 5 and m is an integer from 0 to 3, and/or 0.8 to 2 moles of an amine corresponding to the general formula

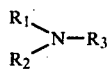

in which $R_1$ and $R_2$ are the same or different and represent alkyl radicals corresponding to the general formula $C_xH_{2+1}$ or $C_xH_{2x}OH$, where x is an integer from 1 to 2, and in which $R_3$ represent hydrogen or an alkyl radical of the general formula $C_xH_{2x+1}$ where x is an integer from 1 to 2, on the reaction product of 1 mole of a polyethylene glycol corresponding to the general formula

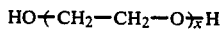

in which x is an integer from 1 to 24, with 2 moles of epichlorhydrin, with from 2.5 to 6.8 moles, based on the polyalkylene polyamine, of the basic polyamino amide as the second component product B known per se, followed by reaction of the intermediate product AI thus formed with the polyfunctional compound. If desired, it is of course possible in accordance with the invention, in order to obtain a certain required viscosity of the end product C, accordingly to vary the quantity of polyfunctional compound finely added to the reaction product AB. In this way, the auxiliary may be varied to a fairly considerable extent without its special effects being in any way reduced. For example, it is possible in this way to obtain auxiliaries which have a viscosity of, on the one hand, 50 cP to, on the other hand, 1000 cP, for example in the form of a 20% by weight aqueous solution at a temperature of 25° C.

The above mentioned possibilities of qualitatively and quantitatively varying the structure of the auxiliary according to the invention enable it to be adapted for a variety of different uses, particularly in the paper making industry. Since the structure of the component product B according to the invention is already known from German Pat. Nos. 2,502,874 and 2,538,745, it is intended here to concentrate more on the structure of the component product A according to the invention. Unless already mentioned above, it should generally be noted in this connection that the polyalkylene glycol ether, which carries neither a positive nor negative charge, is reacted with 1 mole of epichlorhydrin on either side of its chain molecule in the presence of a special catalyst, such as for example a boron trifluoride etherate catalyst, after which the epichlorhydrin is attached on only one side of this chain to the special amine corresponding to the above general formulae. This so-called component product A, in the form of its chloropolyethylene glycol ether amine, is then attached to the component product B known per se, namely a basic polyamino amide, to form a polyethylene glycol ether amine polyamino amide which represents the above mentioned intermediate product AB. This intermediate product AB is then reacted once again with a polyfunctional compound selected from the special group of polyfunctional compounds mentioned earlier on, in the present case preferably with epichlorhydrin, in such a way that the end product C is ultimately present in the form of a polyethylene glycol ether amine polyamino amide epichlorhydrin resin. Although the subject of the invention as a product is not limited to a certain production process, it is intended after the foregoing, more general process-oriented references, to illustrate and hence to disclose the subject of the invention with reference to the exemplary production processes.

The data and figures for free chloride, amine numbers, viscosity and density which are quoted in all the following Examples are all determined by the same methods as described in the following:

1. Chloride determination (procedure and at the same time explanation of Table 2 below).

This is carried out by the known titrimetric precipitation method developed by F. Mohr. In order to prevent possible complex formation of the silver ion with anions which are capable of disturbing the end point of titration, the solution to be analysed is slightly acidified with acetic acid.

2. Determination of amine number (procedure and at the same time explanation of Table 3 below).

This is determined by titrating a hot aqueous resin solution of the above mentioned intermediate product B, in which 1 g of resin is dissolved in 100 ml of water, with 0.1 N hydrochloric acid against methyl red. The spent acid is converted into mg of KOH equivalent to 1 g of pure resin and is expressed as such in the corresponding Table of Examples.

3. Determination of viscosity (procedure and at the same time explanation of Tables 2, 3 and 4 below).

This is quoted essentially for the above mentioned products A, B and C in the corresponding Tables and is determined in a standard Hoppler viscosimeter at 25° C. on 20% by weight aqueous solutions of the corresponding products (ball number 4).

4. Determination of density (procedure and at the same time explanation of Table 4 below).

This is carried out by means of a standard density-measuring instrument at a temperature of 20° C. by allowing a standardised shot-weighted hydrometer to float freely and find its own level or depth of penetration in the liquid to be tested which has a temperature of 20° C. The value situated at the lower meniscus of the liquid, which is a direct indication of the density, is then read off from the scale of the hydrometer.

There now follow the methods which are carried out under the same conditions for testing the service properties of the product to enable the process to be optimally carried out for all the products mentioned in the Examples and which are summarised in Tables 5 and 6. In addition to the products according to the invention covered in Tables 1 to 3, other comparison products, such as those according to the prior art (Examples 12 to 14) are also taken into consideration.

5. Determination of the acceleration of dewatering (procedure and at the same time explanation of Table 5).

The characteristic reduction in the degree of fineness in °SR is determined in accordance with the procedure laid down in Pamphlet No. 107 of the Verein der Zellstoff- und Papierchemiker and Ingenieure. In these Examples, both the retention agents according to the invention and the comparison retention agents are added in the form of aqueous solutions to newsprint pulp suspensions, the concentration of these aqueous solutions being selected in such a way that 0.1 or 0.2 g of the retention agent together with 99.8 g or 99.9 g of the absolutely dry total solid constituents of the pulp suspension give a total solids content of 100% by weight. Since therefore the Figures for grammes correspond to the Figures for 1% by weight, the quantities of retention agent added are given in % by weight in Table 5. The above mentioned newsprint pulp suspension is obtained by mechanically disintegrating standard newsprint and subsequently beating the disintegrated product free from specks in a standard kitchen mixer. The measurements are carried out at pH-values of 6.5 and 4.8 which are adjusted with a 1% by weight aqueous alum solution. The concentration of fibre amounts to 2 g per litre of water. The O-test which is also mentioned in Table 5 is naturally dependent upon the choice of the old paper used.

6. Determination of filler retention (procedure and at the same time explanation of Table 6 below).

In this case, too, the same method of determination is used as in Table 5 both for the Examples according to the invention and also for the other Comparison Examples in order to obtain comparable values. In general, filler retention is characterised by the ash content of sheets of paper produced on the "Rapid-Kothengerat" in accordance with Pamphlet No. V/8/57 of the Verein der Zellstoff- and Papier-chemiker und Ingenieure (of which the old version was Pamphlet No. 108).

The above mentioned sheet of paper which is used for determining the retention capacity of the respective comparison products has the following composition: 80% of bleached sulphite pulp (27 °SR); 15% of China clay; 5% of titanium dioxide and 0.5% of allum (based on absolutely dry paper fibre). The pulp consistency of the sheets of paper amounted to $\triangleq$0.24 g/l of water. The pH-value of the fibre suspension produced from the sheet of paper by introducing it into water amounts to 6.2. The quantity of retention agent added during preparation of the pulp amounts to 0.02% by weight based on absolutely dry retention agent and on absolutely dry paper fibre.

The ash contents quoted in Table 6 are in % by weight.

There now follow the individual Examples, of which Examples 1a, 1b and 1c are described in detail, whereas the other following Examples are given in abbreviated, tabular form because they are carried out under the same conditions as Examples 1a, 1b and 1c. For a complete survey of all the Example material quoted here, the following text Example 1a, 1b and 1c is also included in the synoptic Table.

For reasons of space, the compound names which are written out in full in the Text Examples 1a, 1b and 1c are only given in the form of their abbreviations in the following series of Tables. Accordingly, an explanation of the abbreviations used in the following series of Tables for the chemical starting products is given in the following together with particulars of their concentration or of the medium in which they are dissolved.

1. EP: epichlorhydrin, density 1.18 g. cm$^{-1}$; used throughout in the form of a 98% by weight solution.

2. DTRA: diethylene triamine, used throughout in the form of 100% by weight pure substance.

3. Polydiol: polyethylene glycol ether, used as pure substance, the figure quoted in the Tables indicates the average molecular weight of this compound, for example 400; 600; 1000; 6000 etc.

4. BF$_3$-etherate: boron trifluoride etherate having the summation formula C$_4$H$_{10}$BF$_3$O; used throughout in the form of a 65% by weight solution.

PA: polyamino amide resin solution containing secondary amines as reactive group. 1 mole of this compound corresponds to 1 NH.

6. AS: adipic acid, used throughout in the form of a 100% by weight solid.

7. CL: caprolactam, used throughout in the form of a 100% by weight solid.

8. AH-S: salt of adipic acid and hexamethylene diamine, used throughout as a 100% solid.

9. DEAM: diethanolamine, present throughout as 100% by weight substance.

10. TMA: trimethylamine, present throughout in the form of a 45% by weight aqueous solution.

11. DMA: dimethylamine, present throughout in the form of a 40% by weight aqueous solution.

In further explanation of the following series of Examples it is pointed out by way of explanation of the Tables quoted therein that, in Table 1, the component products A according to the invention, which always contain the polydiols in the same molar quantity, but with different molecular weights, are reacted with twice the molar quantity of epichlorhydrin. The amine components used were diethylene triamine (DTRA), dimethylamine (DMA), trimethylamine (TMA) and diethanolamine (DEAM). The intermediate analytical values of the component products A are summarised in Table 2 which follows Table 1.

Table 3 shows that, in the corresponding Example 1b to 3b, the intermediate product B always contains the same quantities of adipic acid (AS) and diethylene triamine (DTRA). In addition, caprolactam (CL) was additionally used in Example 1b, whilst the salt of adipic acid and hexamethylene diamine (hexamethylene diammonium adipate; AH-S) was additionally used accordingly in Example 3b.

As can be seen from Table 4, the ratio of component product A to component product B was adjusted to 1:3.33 in the production of the end products C. Only in Example 11c which is also shown in this Table was the above mentioned ratio changed and adjusted to 1:6.65.

Table 5 summarises the acceleration of dewatering as measured in °SR, the influence of the extremely high molecular weight polydiol (average molecular weight 6000) used in Example 10c being negatively reflected in the fact that the reduction in the degree of fineness obtained is less pronounced by comparison with the Examples according to the invention. Although therefore the procedure adopted corresponded to the invention in qualitative terms, a polydiol having a molecular weight of 6000 was used in the quantitative respect, i.e. instead of the polydiols having average molecular weights of 400 and 1000 which alone are suitable for the purposes of the invention. This produces such poor results that no improvement is obtained over the prior art. Accordingly, Table 5 shows inter alia that polydiols having an average molecular weight of no higher than about 1200 should be used if the products are to have the structure according to the invention and, hence, are to show an excellent retention and dewatering effect. The Example in which the polydiol unit has an average molecular weight of 6000 may therefore be counted as one of the Comparison Examples briefly discussed in the following. Example 1b[1] which appears in Table 4 may also be counted as another Comparison Example. It is intended to show that, without the incorporation of component product A according to the invention, i.e. only where the known intermediate product B is cross-linked with epichlorhydrin, the resulting auxiliary for improving retention, dewatering and working up gives considerably poorer retention, dewatering and flocculation values than products which have been produced in accordance with the Examples corresponding to the invention. In addition, Table 5 shows further Examples corresponding to the invention taken from the most important prior art publications: Example 12 corresponds to Example 1 of German Patent No. 1,771,814; Example 13 corresponds to Example 1 of DT-OS No. 2,353,430; Example 14 corresponds to Example 1 of German Pat. No. 2,502,874.

As mentioned above, the comparison in Table 5 between the Examples according to the invention and the prior art Examples in regard to the use of the products proves that the products according to the invention are distinctly superior to the hitherto known products in regard to the acceleration of dewatering. The comparison in Table 6 of the filler retention capacities of the corresponding products may also be interpreted in this sense.

There now follow the individual Examples:

EXAMPLE 1

1(a) Production of component product A:

160 g of polyethylene glycol ether having an average molecular weight of 400, corresponding to 0.4 mole, are introduced into a 4 liter capacity spherical glass flask equipped with a standard anchor stirrer, a thermometer, a reflux condenser and an inlet funnel, and mixed with 2 ml of a boron trifluoride etherate catalyst solution (catalyst summation formula: $C_4H_{10}BF_3O$). This mixture is heated to 60° C. by means of a water bath and the polydiol present in the mixture is reacted with epichlorhydrin added slowly in a total quantity of 75.5 g, corresponding to 0.8 mole. The reaction takes place in the form of an addition reaction over a period of 2.5 hours at a reaction temperature of at most 65° C. Following the addition of 271.7 ml of deionised water which is stirred in over a period of 2 minutes at 65° C., the product formed, namely polyethylene glycol ether-bis-$\beta$-hydroxy-$\gamma$-chloropropyl ether, has 35.4 g of DTRA, corresponding to 0.336 mole, added to it through an inlet funnel. During the reaction thus initiated between the DTRA and the abovementioned intermediate product, the temperature is kept at 65° C., if necessary by cooling with water. After 1 hour, the temperature of the reaction solution falls on account of the ending of the reaction between the above mentioned substances. On analysis, the component product A formed in this way ($\beta$-hydroxy-$\gamma$-chloropropyl-polyethylene glycol ether-$\beta$-hydroxy-$\gamma$-propylamine) produced the following values:
pH-value: 8.51
concentration; 50.10% by weight
free chloride: 17.00 g corresponding to 60% of the theoretical, based on epichlorhydrin.

1(b) Production of component product B:

1460.2 g of adipic acid (100% by weight, corresponding to 10 moles, solid); 1124.5 g of diethylene triamine (100% by weight, corresponding to 10.9 moles; liquid) and 226.34 g of caprolactam (100% by weight, corresponding to 2 moles; solid) were introduced in the form of their pure substances into a pressure vessel in the form of a steel autoclave equipped with a stirrer, a temperature gauge in the form of a thermosensor and a distillation condenser. After the contents of the pressure vessel have been covered with oxygen-free nitrogen to replace the supernatant residual gas mixture and after the reaction vessel has been closed, the contents are heated to 160° C. and stirred for 30 minutes at that temperature. The water of reaction liberated is then distilled off (60 ml in all, corresponding to 100% of the theoretical). The reaction mixture which is now free from water of condensation is then further heated to 180° C. and stirred at that temperature for another 2 hours, during which it reacts further, nitrogen being continuously passed over the condensing reaction mixture.

After the polycondensate melt formed has been cooled to 135° C., a total of 2553 ml of water is added to it with further cooling. The aqueous polyaminoamide resin solution formed is then analysed with the following results:
solids content: 48% by weight;
amine number: 285 mg KOH/g of resin;
pH-value: 10.8;
viscosity: 360 cP (25° C.).

1(c) Production of the end product C:

In the 4 liter capacity spherical glass flask mentioned in Example 1a above, water is initially added to 543.4 g of the 50% by weight component product A, corresponding to 0.4 mole, based on polydiol 400 in the form of $\beta$-hydroxy-$\gamma$-chloropropyl-polyalkylene glycol ether-$\beta$-hydroxy-$\gamma$-propylamine, in the same quantity by weight so that a 25% by weight solution is formed.

624.4 g of a 48% by weight solution of component product B, as produced in known manner in accordance with Example 1b above, are then added in the form of the basic polyaminoamide resin solution, followed by the addition with stirring of 574.4 g of water. The contents of the vessel are then heated with continued stirring for 2 hours to a temperature of 80° C., the halogen group of component product A reacting with the —NH-groups of component product B with elimination of hydrohalic acid to form the intermediate product AB. After the product AB has been formed, 11.35 ml of epichlorhydrin in the form of 98% by weight product having a density of 1.18 g. cm$^{-3}$ are added to the contents of the vessel at the above mentioned temperature. After the reaction between the above mentioned intermediate product AB and the epichlorhydrin added to it has been in progress for 7.5 hours, the increase in viscosity caused by the reaction virtually stops, so that the end product C is obtained in the form of a clear highly viscous solution of polyethylene glycol ether amine-polyamino amide-epichlorhydrin resin. Analysis of this end product C according to the invention produced the following results:

pH-value: 8.35;
solids content: 25.31% by weight;
viscosity: 225 cP (at 25° C.);
density: 1.056 g/cc (at 20° C.).

As already mentioned, the following further Examples summarised in the following Tables are carried out in the same way and under the same conditions as Examples 1a, 1b and 1c above. As also already mentioned, Example 1a, 1b and 1c above are also included in summary form in the following Tables in the interests of a better synopsis.

TABLE 1

Production of component products A

| | Starting Products | | | | | | | | | Diluting water |
|---|---|---|---|---|---|---|---|---|---|---|
| | Polydiol | | | EP | | BF₃-catalyst | Amine | | | |
| Example | type | mole | g | mole | g | ml | type | mole | g | ml |
| 1a | 400 | 0.40 | 160 | 0.80 | 75.5 | 2.00 | DTRA | 0.336 | 35.4 | 271.7 |
| 2a | 600 | 0.40 | 240 | 0.80 | 75.5 | 2.00 | DTRA | 0.336 | 35.4 | 350.9 |
| 3a | 400 | 0.40 | 160 | 0.80 | 75.5 | 2.00 | DMA | 0.336 | 37.8 | 250.5 |
| 4a | 400 | 0.40 | 160 | 0.80 | 75.5 | 2.50 | TMA | 0.80 | 104.8 | 283.3 |
| 5a | 400 | 0.40 | 160 | 0.80 | 75.5 | 2.00 | DTRA | 0.30 | 31.0 | 267.2 |
| 6a | 400 | 0.40 | 160 | 0.80 | 75.5 | 1.50 | DTRA | 0.364 | 37.5 | 271.7 |
| 7a | 400 | 0.40 | 160 | 0.80 | 75.5 | 1.50 | DEAM | 0.50 | 52.6 | 288.1 |
| 8a | 1000 | 0.40 | 400 | 0.80 | 75.5 | 2.70 | DTRA | 0.336 | 35.4 | 510.9 |
| 9a | 6000 | 0.40 | 2400 | 0.80 | 75.5 | 3.00 | DTRA | 0.336 | 35.4 | 2510.9 |

TABLE 2

Intermediate analysis of the component products A according to the invention as identified in Table 1

| Example | pH-value | Solids content % by weight | Free chloride* g | Free chloride* % by weight | Viscosity cP/20° C. |
|---|---|---|---|---|---|
| 1a | 8.51 | 50.12 | 17.0 | 60.0 | 51 |
| 2a | 8.46 | 50.22 | 16.2 | 57.0 | 60 |
| 3a | 8.62 | 50.08 | 14.5 | 51.0 | 59 |
| 4a | 8.49 | 50.05 | 18.0 | 63.5 | 52 |
| 5a | 8.56 | 50.07 | 14.3 | 50.5 | 56 |
| 6a | 8.39 | 50.15 | 19.3 | 68.1 | 60 |
| 7a | 8.42 | 49.98 | 14.7 | 52.0 | 59 |
| 8a | 8.64 | 50.30 | 16.2 | 57.1 | 63 |
| 9a | 8.41 | 50.04 | 16.3 | 57.5 | 68 |

*based on EP, eliminated by amine addition

TABLE 3

Production of component product B

| | Starting product (quantities in grammes and moles) | | | | | | | | Component product B (analytical values) | | |
|---|---|---|---|---|---|---|---|---|---|---|---|
| | AS | | DTRA | | CL | | AH-S | | solids content | amine number mg KOH/g resin | viscosity cP | pH-value |
| Example | g | mole | g | mole | g | mole | g | mole | % by weight | | | |
| 1b | 1460.2 | 10 | 1124.5 | 10.9 | 226.34 | 2 | — | — | 48.00 | 285 | 360 | 10.80 |
| 2b | 1460.2 | 10 | 1031.7 | 10.0 | — | — | — | — | 47.95 | 266 | 758 | 10.80 |
| 3b | 1460.2 | 10 | 1031.7 | 10.0 | — | — | 452.68 | 2 | 48.10 | 283 | 380 | 10.60 |

TABLE 4

Production of end product C according to the invention

| | Starting product Quantities of component products A and B used in the form of their 25% by weight Solutions | | | | | | Molar ratio of component products A to B | Intermediate product AB 25% solution g | Quantity of epichlorhydrin added to AB in ml | End product (analytical values) | | | |
|---|---|---|---|---|---|---|---|---|---|---|---|---|---|
| | A | | | B | | | | | | | Solids content in % by weight | Viscosity in cP | Density at 20° C. in g/cc |
| Example | g | mole | according to Example in Table 1 | g | mole | according to Example in Table 3 | | | | pH | | | |
| 1c | 1086.4 | 0.40 | 1a | 1198.8 | 1.33 | 1b | 1:3.33 | 2171.8 | 11.35 | 8.35 | 25.39 | 223 | 1.056 |
| 2c | 1086.4 | 0.40 | 1a | 1134.2 | 1.33 | 2b | 1:3.33 | 2107.2 | 12.45 | 7.90 | 25.24 | 270 | 1.048 |
| 3c | 1086.4 | 0.40 | 1a | 1336.5 | 1.33 | 3b | 1:3.33 | 2309.5 | 10.92 | 8.10 | 25.07 | 230 | 1.050 |
| 4c | 1403.6 | 0.40 | 2a | 1336.5 | 1.33 | 3b | 1:3.33 | 2626.7 | 10.37 | 8.15 | 25.10 | 244 | 1.061 |
| 5c | 1403.6 | 0.40 | 2a | 1198.8 | 1.33 | 1b | 1:3.33 | 2489.0 | 10.63 | 7.85 | 25.12 | 215 | 1.049 |
| 6c | 1047.6 | 0.40 | 3a | 1198.8 | 1.33 | 1b | 1:3.33 | 2133.0 | 18.62 | 8.05 | 25.29 | 309 | 1.050 |
| 7c | 1247.2 | 0.40 | 4a | 1198.8 | 1.33 | 1b | 1:3.33 | 2332.56 | 19.49 | 8.19 | 25.35 | 254 | 1.056 |
| 8c | 1152.4 | 0.40 | 7a | 1198.8 | 1.33 | 1b | 2:3.33 | 2237.8 | 16.25 | 7.82 | 25.24 | 295 | 1.051 |
| 9c | 2043.6 | 0.40 | 8a | 1198.8 | 1.33 | 1b | 1:3.33 | 3129.0 | 34.70 | 7.65 | 25.41 | 385 | 1.068 |
| 10c | 5020.9 | 0.40 | 9a | 1198.8 | 1.33 | 1b | 1:3.33 | 6106.7 | 45.10 | 7.48 | 25.49 | 219 | 1.081 |
| 11c₁ | 543.2 | 0.20 | 1a | 1198.8 | 1.33 | 1b | 1:6.65 | 1685.3 | 16.34 | 8.40 | 25.30 | 195 | 1.053 |
| 1c̄ | — | — | — | 1198.8 | 1.33 | 1b | —:— | — | 15.40 | 9.05 | — | 160 | 1.084 |

TABLE 5

Acceleration of dewatering, as measured by the reduction in fineness of grinding in °SR

| Example | Addition of end product C (Examples 1c to 9c) and of comparison substances (Examples 10c to 14) to pulp suspensions having a pH of | | | | Pulp suspension without the addition of end product C or comparison substance (0-tests) at a pH value of | |
|---|---|---|---|---|---|---|
| | 6.5 in % by weight quantities of | | 4.8 in % by weight quantities of | | | |
| | 0.1 | 0.2 | 0.1 | 0.2 | 6.5 | 4.8 |
| 1c | 33 | 22 | 50 | 44 | 58 | 65 |
| 2c | 32 | 23 | 51 | 45 | 58 | 65 |
| 3c | 31 | 22 | 50 | 43 | 59 | 66 |
| 4c | 33 | 21 | 51 | 44 | 58 | 65 |
| 5c | 32 | 23 | 50 | 44 | 59 | 65 |
| 6c | 32 | 22 | 50 | 43 | 59 | 66 |
| 7c | 31 | 22 | 49 | 44 | 59 | 66 |
| 8c | 34 | 23 | 52 | 45 | 58 | 65 |
| 9c | 36 | 27 | 52 | 46 | 58 | 66 |
| 10c | 48 | 43 | 56 | 53 | 58 | 66 |
| 11c₁ | 34 | 24 | 51 | 46 | 59 | 66 |
| 1b | 47 | 40 | 60 | 54 | 59 | 66 |
| 12* | 46 | 40 | 59 | 54 | 59 | 66 |
| 13** | 42 | 33 | 56 | 50 | 59 | 66 |
| 14*** | 38 | 29 | 53 | 48 | 59 | 66 |

*(Example 1 of German Pat. No. 1,771,814);
**(Example 1 of DT-OS No. 2,353,430);
***(Example 1 of German Pat. No. 2,502,874)

TABLE 6

Filler retention capacity

| Example | | Ash content in % by weight in the paper (absolutely dry) |
|---|---|---|
| 1c | | 8.16 |
| 2c | | 8.01 |
| 3c | | 8.10 |
| 4c | | 8.12 |
| 5c | | 8.08 |
| 6c | | 8.14 |
| 7c | | 8.09 |
| 8c | | 8.13 |
| 9c | | 7.95 |
| 10c | | 6.78 |
| 11c | | 8.02 |
| 1b₁ | | 7.05 |
| 12 | Example 12 of German Patent No. 1,771,814 | 7.14 |
| 13 | Example 1 of DT-OS No. 2,353,430 | 7.38 |
| 14 | Example 1 of German Patent No. 2,502,874 | 7.80 |

Although the auxiliary according to the invention for improving the retention of flushable solids, for accelerating the dewatering of suspensions and for more rapidly working up industrial waters, effluents and sludges by the addition of basic water-soluble polymers in the form of an aqueous polymer solution may be used with advantage above all in the paper industry, it is also eminently suitable for working up industrial effluents, for purifying effluents and for conditioning sludges in other branches of industry. In the context of the invention, the expression "sludge processing" includes the working up of fresh sludge and activated sludge and also the sludge concentration and sludge flotation processes known per se in which the auxiliary according to the invention may be used with considerable effect. In this connection, it is a considerable advantage that the auxiliary according to the invention is unaffected by the addition of a number of various other substances, for example in purification processes, so that it is readily possible for example to add inorganic flocculating agents of the type commercially available for example on the basis of aluminium and iron salts or on the basis of calcium compounds, without the auxiliary according to the invention being adversely affected in regard to its service properties.

Where the auxiliary according to the invention is used in settling basins, it is best added in a quantity of from about 0.1 to 4 mg per liter of the substance to be clarified.

In other cases, for example in the conditioning of sewage, in the removal of water from dry gels or in cases where mechanical processes, for example centrifuging, are applied, the water can be removed from the sludge more effectively and more quickly by adding the auxiliary according to the invention to the substance to be treated in quantities of from about 2 to 12 kg per tonne of dry sludge.

If it is desired to stabilise the sludge to be treated, it is best to add from about 50 to 150 mg of the auxiliary according to the invention per corresponding quantitative unit of the sludge. In this way, the auxiliary according to the invention advantageously stabilises the sludge by promoting the formation of non-disintegrating flakes.

In its most important field of application, namely paper making, the auxiliary according to the invention may of course be added not only separately, but also in admixture with the other substances normally used in paper making, such as for example dyes, antioxidants, optical lighteners and fluorescent agents, because it is unaffected by these substances. In practice, the above mentioned additional process of mixing the additives beforehand is widely applied because in general optical lighteners and fluorescent agents for example are only required in small quantities in the paper in order to obtain the required modification to the appearance of the paper.

Further applications for the auxiliary according to the invention are based on the advantageous effect of the auxiliary in obtaining high shearing stability which is important when for example pumps, vibrating sieves and other equipment are used in paper making.

Apart from paper making, the auxiliary according to the invention may of course also be used in fields totally different from those mentioned above. The auxiliary according to the invention may be used as effectively as a hair-fixing agent or as an agent for anchoring basically hydrophobic coating agents applied in the form of aqueous dispersions or other solutions to supports such as, for example, sheet-form structures of all kinds, as an agent for improving the wet strength of sheet-form materials (particularly paper). In the latter case, however, the auxiliary is with advantage acidified.

In general, the auxiliary according to the invention is highly stable in storage, even in a basic medium, providing, as known per se to the expert, only as much crosslinking agent as required is added for crosslinking, for example with epichlorhydrin, during production of the auxiliary.

If by way of exception or by accident the cross-linking agent is added in excess, the auxiliary can nevertheless be used, although in that case it has to be acidified to obtain adequate stability in storage so that gelation which might otherwise occur is reliably prevented in this case, too.

We claim:

1. An auxiliary for improving the retention of flushable solids, for accelerating the dewatering of suspensions and for more rapidly working up industrial waters, effluents and sludges by the addition of a basic water-soluble polymer in the form of an aqueous polymersolution said polymer being produced by reacting
   (a) an aliphatic polyethylene glycol ether amine prepared by reacting a polyethylene glycol/epihalohydrin condensate with

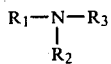

or a polyamine of the formula

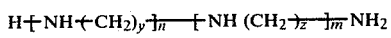

or mixtures thereof wherein $R_1$ and $R_2$ may be the same or different and each is $C_xH_{2+1}$ or $C_xH_{2x}$—OH and $R_3$ is H or $C_xH_{2x+1}$ and x is an integer from 1–4, y and z are each integers of 2–4, n is an integer of 2–5 and m is an integer of 0–5; and said condensate is the reaction product of about 2 parts epihalorhydrin per part polyethylene glycol of the formula $$HO\text{---}(CH_2CH_2O)_{\overline{p}}\text{---}H$$

where p is an integer of 1–27; and
   (b) a basic polyamino amide whereby the halogens of compound (a) react with the —NH moieties of the polyamino amide with elimination of hydrohalic acid to form an intermediate product; and
   (c) reacting said intermediate with a member selected from the group consisting of epibromhydrin, epifluorhydrin, epichlorhydrin, dihaloalkanes, glyoxal-bis-acrylamide, bisacrylamidoacetic acid, acrylamidoglycolic acid and tetraalkyloxyethane.

2. The auxiliary as claimed in claim 1 wherein said member of step (c) is epichlorhydrin.

3. The auxiliary as claimed in claim 1 wherein step (a) said amine is 0.25 to 1 part per part polyethylene glycol of a polyamine of the formula

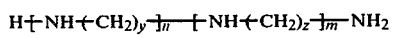

or 0.25 to 2 parts per part polyethylene glycol or

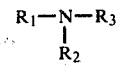

or mixtures thereof wherein $R_1$ and $R_2$ may be the same or different and each is $C_xH_{2+1}$ or $C_xH_{2x}$—OH and $R_3$ is H or $C_xH_{2x+1}$ and x is an integer from 1–4, y and z are each integers of 2–4, n is an integer of 2–5 and m is an integer of 0–5;
   said condensate is the reaction product of about 2 parts epichlorhydrin per part polyethylene glycol of the formula $$HO\text{---}(CH_2CH_2O)_{\overline{p}}\text{---}H$$

where p is an integer of 1–27; and
   wherein the ratio of said polyethylene glycol ether amine (a) and said basic polyamino amide (b) is 1:0.5–7.

4. The auxiliary as claimed in claim 1 wherein step (a) said amine is 0.7 to 1 part per part polyethylene glycol of a polyamine of the formula

or 0.8 to 2 parts per part polyethylene glycol of

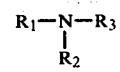

thereof wherein $R_1$ and $R_2$ may be the same or different and each is $C_xH_{2+1}$ or $C_xH_{2x}$—OH and $R_3$ is H or $C_xH_{2x+1}$ and x is an integer from 1–2, y and z are each integers of 2–3, n is an integer of 2–5 and m is an integer of 0–3;
   said condensate is the reaction product of 2 parts epcihlorhydrin per part polyethylene glycol of the formula

where p is an integer of 1–24; and
   wherein the ratio of said polyethylene glycol ether amine (a) and said basic polyamino amide (b) is 1:2.5–6.8.

5. Improving the retention of flushable solids, accelerating the dewatering of suspensions and for more rapidly working up industrial waters, effluents and sludges by adding an aqueous polymer solution of a basic water-soluble polymer according to claim 1.

* * * * *